(12) United States Patent
Vanghi

(10) Patent No.: US 6,937,861 B2
(45) Date of Patent: Aug. 30, 2005

US006937861B2

(54) CONNECTION MANAGEMENT FOR DUAL MODE ACCESS TERMINALS IN A RADIO NETWORK

(75) Inventor: Vieri Vanghi, La Jolla, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 557 days.

(21) Appl. No.: 09/782,557

(22) Filed: Feb. 13, 2001

(65) Prior Publication Data

US 2002/0111169 A1 Aug. 15, 2002

(51) Int. Cl.[7] .............................. H04Q 7/20
(52) U.S. Cl. ............. 455/436; 455/426.1; 455/428; 455/434; 455/560; 455/437; 455/442; 370/315; 370/335; 370/336; 370/468
(58) Field of Search .................. 455/436, 426.1, 455/428, 553.1, 552.1, 560, 434, 466, 437, 442; 370/315, 335, 336, 467, 468

(56) References Cited

U.S. PATENT DOCUMENTS

| | | | | |
|---|---|---|---|---|
| 5,471,670 A | * | 11/1995 | Hess et al. ................ | 455/437 |
| 5,633,913 A | * | 5/1997 | Talarmo ................... | 455/446 |
| 5,664,007 A | * | 9/1997 | Samadi et al. ............ | 455/442 |
| 5,873,043 A | * | 2/1999 | Comer ..................... | 455/458 |
| 5,917,811 A | * | 6/1999 | Weaver et al. ............ | 370/332 |
| 5,924,042 A | * | 7/1999 | Sakamoto et al. ......... | 455/458 |
| 5,960,344 A | * | 9/1999 | Mahany ................... | 455/432.2 |
| 6,026,297 A | | 2/2000 | Haartsen | |
| 6,128,489 A | * | 10/2000 | Seazholtz et al. ......... | 455/432.1 |
| 6,240,292 B1 | * | 5/2001 | Haberman et al. ........ | 455/439 |
| 6,249,681 B1 | * | 6/2001 | Virtanen .................. | 455/466 |
| 6,512,756 B1 | * | 1/2003 | Mustajarvi et al. ....... | 370/341 |
| 6,542,743 B1 | * | 4/2003 | Soliman ................... | 455/436 |
| 6,553,064 B1 | * | 4/2003 | Chen et al. ............... | 375/224 |
| 6,553,229 B1 | * | 4/2003 | Dent ....................... | 455/434 |
| 6,574,473 B2 | * | 6/2003 | Rinne et al. .............. | 455/436 |

FOREIGN PATENT DOCUMENTS

| | | |
|---|---|---|
| DE | 19845071 | 1/2000 |
| EP | 0872982 | 10/1998 |
| WO | WO0033595 | 6/2000 |

* cited by examiner

Primary Examiner—Marceau Milord
(74) Attorney, Agent, or Firm—Coats & Bennett, P.L.L.C.

(57) ABSTRACT

A maximum suspension time defines the length of time that an access terminal may suspend communication with a supporting radio network before the network releases the communication resources assigned to the access terminal. In some environments, it may be necessary for the access terminal to momentarily suspend communication with a first radio network, so that it can briefly communicate with a second radio network. For example, the access terminal may briefly suspend a packet data connection with a packet data network to maintain its registration on a voice/data network. Upon completing communication with the second network, the access terminal resumes communication with the first network using the previously assigned communication channels, if the suspension time is less than the maximum suspension time. If the actual time of suspension exceeds the maximum allowed, the access terminal requests a new connection with the first radio network.

37 Claims, 7 Drawing Sheets

CONNECTION MANAGEMENT FOR DUAL MODE ACCESS TERMINALS IN A RADIO NETWORK

BACKGROUND OF THE INVENTION

The present invention relates to wireless communication systems in general, and particularly relates to managing connections between a radio network and an access terminal.

Wireless communication services are, for many people, an integral part of everyday life. Beyond the convenience and safety afforded by voice communication services, an increasing number of users expect their wireless devices and supporting radio networks to provide ready, useful access to an increasingly rich array of information services. Wireless connection with the Internet illustrates a primary example of the trend toward providing a broad range of increasingly sophisticated communication services.

In general, 1st and 2nd generation radio networks were designed primarily to handle voice communications. These networks have been adapted to handle some data communications, such as fax communications, but are not particularly suited to handle packet data. Therefore, new radio communication protocols specifically adapted to handle packet data communications have evolved and are currently being implemented. Some of these new communication protocols, such as IS-2000, are capable of both voice and data communication. Other communication protocols being developed, such as the General Packet Radio Service (GPRS) and IS-856 standard are intended to handle packet data traffic, but not voice traffic. One advantage of dedicated packet data networks is that they are capable of relatively high data rates as compared to radio networks that handle both voice and packet data.

Since packet data services are popular among consumers and business users, many access terminal manufacturers offer dual mode access terminals that can communicate with both voice networks, such as an IS-95 or IS-2000 radio network, and packet data networks, such as an IS-856 network. Thus, a user can use the same access terminal to establish a connection with a packet data network to browse the Internet, or to connect with a voice network to place a voice call. In the very near future, dual mode access terminals will be able to handle simultaneous voice and data connections.

Incompatible standards employed by packet data and voice networks pose a problem for dual mode access terminals. For example, the packet data network may employ a different communication protocol than the voice network. In some cases, the different communication protocols used by the different radio networks prevent sharing information between radio networks or interworking to facilitate dual mode operation. Thus, the access terminal must carry the burden of maintaining communications with two incompatible radio networks. In these circumstances the access terminal must comply with the communication protocols of both radio networks.

This inter-network incompatibility poses certain connection management challenges when an access terminal maintains communication with two or more incompatible radio networks. Assume, for example, that the access terminal is capable of dual mode operation in an IS-856 network and an IS-2000 network. In the IS-856 network, the access terminal is expected to transmit continuously on the reverse traffic channel (RTC), monitor the forward control channel, and demodulate the reverse link power control (RPC) channel, while its connection to the radio network is open. At the same time, the access terminal must be able to receive page requests that are sent from the Mobile Switching Center (MSC) via the IS-2000 radio network while maintaining its connection with the IS-856 radio network. Such page requests may be intended for voice call delivery or Short Message Service (SMS) delivery, or delivery of other services. The access terminal must also be able to perform certain procedures required by the IS-2000 radio network, such as idle hand-off procedure, registration procedures, as well as many other idle state procedures.

In the current state of the art, an access terminal with an active connection on the IS-856 radio network temporarily suspends communication with the IS-856 radio network to monitor the paging channel and detect incoming pages in the IS-2000 network, if any, and to perform idle hand-offs, registration, or other idle state procedures if necessary. When the access terminal is finished monitoring the paging channel and performing other idle state procedures, it then resumes communication with the IS-856 radio network by resuming its transmission on the RTC and its monitoring of the forward control channel.

When the access terminal ceases communication with IS-856 radio network to monitor the paging channel on the IS-2000 radio network or to perform other idle state procedures, the IS-856 radio network initiates a fade timer. If the access terminal does not resume communications before the expiration of the fade timer, the IS-856 radio network may terminate the access terminal's connection and release resources associated with that connection. Those resources include the traffic channels assigned to the access terminal and the RPC channel that is used by the serving base station for closed loop reverse link power control. The access terminal may be unaware that its connection with the IS-856 radio network was terminated.

Problems may arise if the access terminal attempts to resume communication on the IS-856 radio network after its connection has been terminated. If the access terminal subsequently resumes communication unaware that resources needed for RTC demodulation have been de-allocated, its transmission on the RTC will appear as noise to the radio network increasing the level of interference at the base station receiver. Further, if an access terminal returning from suspended communication fails to recognize that its previously allocated RPC channel has been reassigned to a second access terminal, it may erroneously respond to power control commands intended for the second access terminal. In some circumstances, the interfering access terminal could increase its transmit power to the point that the base station receiver is desensitized, which may cause other active access terminals to also increase their transmit power, which may further desensitize the base station receiver. If the level of desensitization exceeds a certain limit, the base station receiver may suffer a reverse link outage, which in extreme circumstances may lead to a complete service disruption.

BRIEF SUMMARY OF THE INVENTION

The present invention provides a method and system to control how an access terminal reestablishes connection with a radio network after a brief suspension of communication with that radio network. The parameters associated with operating in the radio network include a time-out value that defines the maximum time the access terminal can suspend its communication with the radio network before the radio network releases and possibly reassigns the communication resources associated with the access terminal's suspended connection. In this manner, the access terminal knows whether it should resume communication using the suspended connection, or whether it should request a new connection with the radio network.

As an example, an access terminal may operate with both an IS-856 radio network and an IS-2000 radio network. Assuming the mobile terminal has established a connection with the IS-856 radio network, it may be necessary from time to time for it to also communicate with the IS-2000 radio network. Such need may arise, for example, from the necessity to monitor IS-2000 paging channels, or perform an idle state hand-off procedure. When communicating with the IS-2000 radio network, the access terminal suspends communication with the IS-856 network. The length of time spent in communication with the IS-2000 network depends on the specific activity and may vary from well under one second, to in excess of several seconds.

Because the access terminal knows the maximum time the IS-856 radio network will maintain its suspended connection, it knows whether or not it should resume communication with the IS-856 network using the suspended connection. If the access terminal has suspended its communication with the IS-856 radio network for longer than the maximum allowed suspension time, it will request a new connection the network. In so doing, the access terminal avoids communicating with the IS-856 radio network on communication channels associated with its prior connection that may have already been reassigned by the IS-856 radio network to another access terminal.

By requesting a new connection with the radio network rather than resuming communication using its prior connection, the returning access terminal avoids using a reverse traffic channel for which radio network resources have been de-allocated. Further, the returning access terminal avoids using its prior RPC channel, which may have been reallocated by the radio network to another access terminal. Otherwise, the returning access terminal would begin erroneously controlling its reverse link transmit power based on reverse link power control commands meant for the access terminal to which the RPC channel has been reassigned.

DETAILED DESCRIPTION OF THE INVENTION

The present invention embodies several aspects of radio network connection management, and offers connection management techniques that may be particularly beneficial in certain types of radio networks. More particularly, certain of these connection management techniques support connection management where an access terminal that has connected to a radio network momentarily suspends that connection, and then returns to the network an uncertain time later.

On that basis, the discussion below begins with a description of certain aspects of the present invention in the context of two particular types of radio networks, an cdma2000 radio network and a cdma2000 high rate packet data radio network. The Telecommunication Industry Association/ Electronic Industry Association (TIA/EIA) Interim Standard 2000 (IS-2000) covers the cdma2000 radio network, while the TIA/EIA IS-856 standard describes the packet data radio network. It should be understood that connection management as presented herein has applicability well beyond these two types of radio networks.

Figure 1:
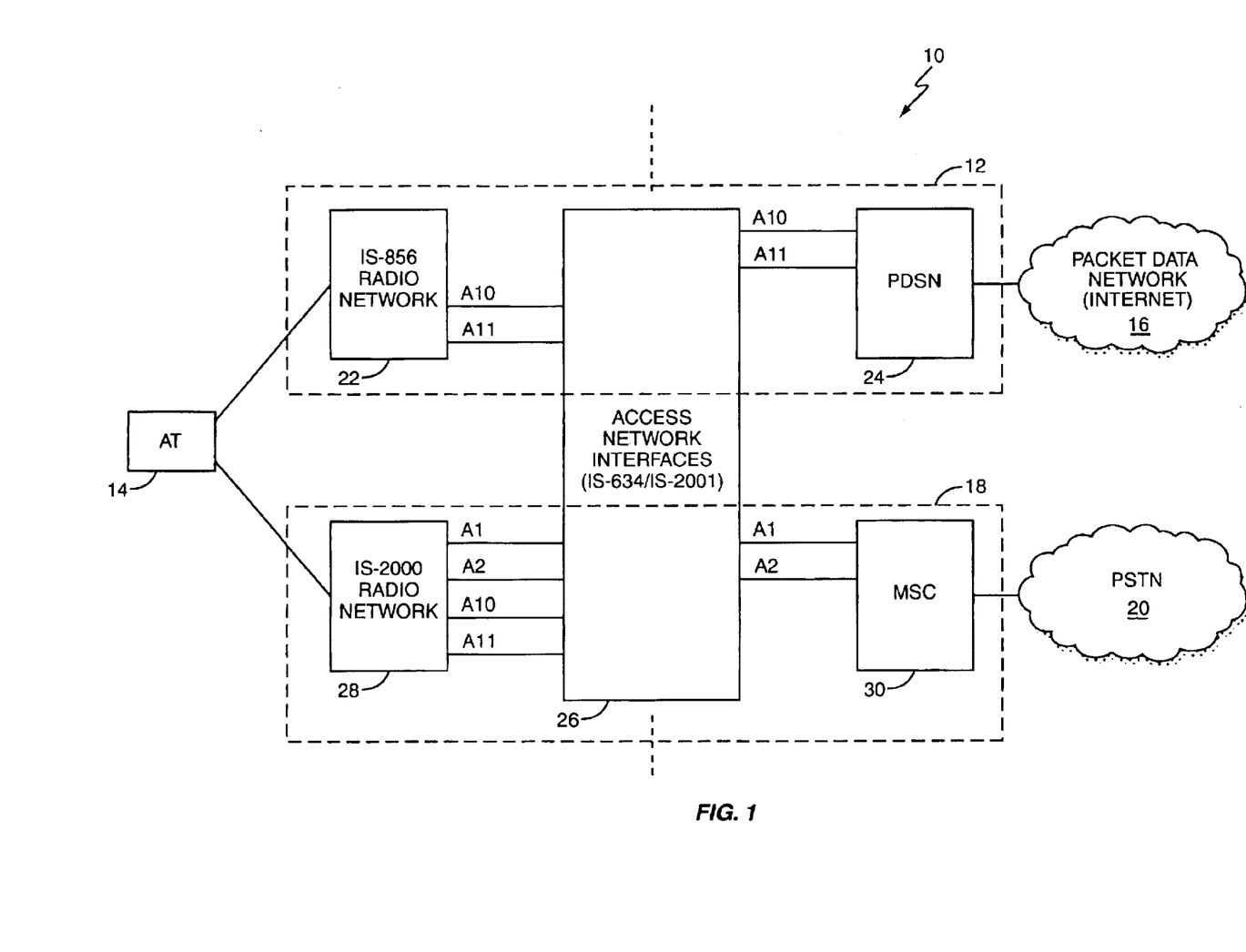
FIG. 1 is a diagram of a wireless communication system comprising multiple access networks.

Turning now to the drawings, FIG. 1 is a diagram of a wireless communication system 10 comprising a first access network 12 providing communication between an access terminal 14 and a packet data network 16, such as the Internet. A second access network 18 provides communication between the access terminal 14 and the Public Switched Telephone Network (PSTN) 20. Note that access network 18 may also provide connection with the packet data network 16 for some types of communication with the access terminal 14.

Access network 12 comprises a radio network 22 operating in accordance with IS-856 and provides high data rate packet-based communications between the Internet 16 and the access terminal 14 by interfacing with a Packet Data Serving Node (PDSN) 24 through an access network interface 26. In the illustrated embodiment, the access network interfaces comply with the IS-634 and IS-2001 standards, the details of which are not material to the invention.

Access network 18 comprises a radio network 28 operating in accordance with IS-2000 and provides communication between the access terminal 14 and the PSTN 20 by interfacing with a mobile switching center (MSC) 30 through the access network interface 26. Access network 18 may also provide communication between the access terminal 14 and the Internet 16 via the access network interface 26, however the data rates supported with this type of connection are generally lower than those available with access network 12, which is explicitly intended to support high packet data rates.

In operation, a subscriber connects with the access network 12 by establishing a connection with the radio network 22. To establish a connection, the radio network 22 allocates network resources to support the connection. The network resources include a reverse traffic channel and a reverse power control (RPC) channel used for reverse link power control, which is described in greater detail below.

Figure 2A:
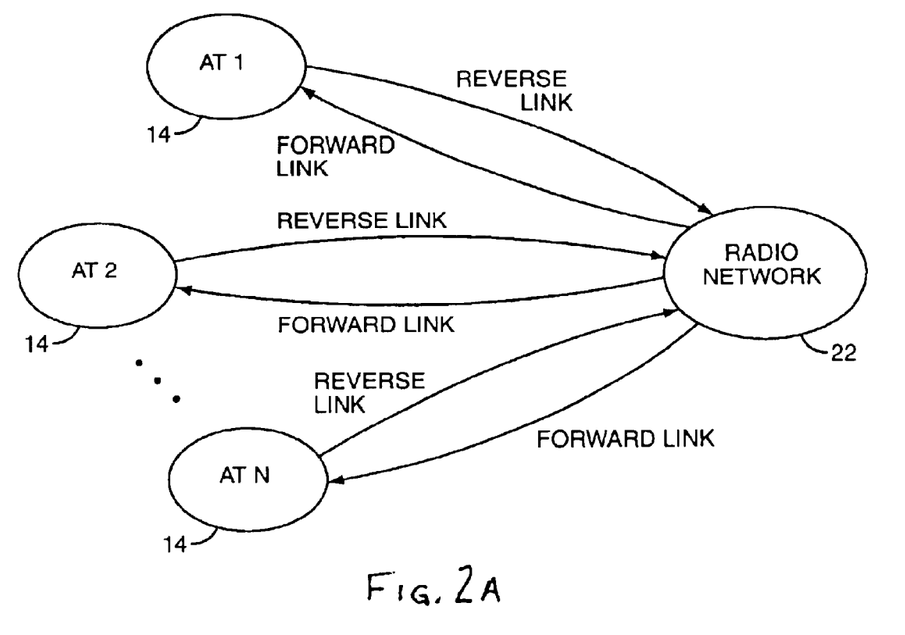
FIG. 2A is a diagram of a radio network of FIG. 1 supporting communication with a number of access terminals.

FIG. 2A illustrates a plurality of access terminals 14 engaged in open packet data connections with the radio network 22. Each access terminal 14 has both forward and reverse communication links established with the radio network 22, which support data transfer to and from the access terminals 14, as well as providing control and status information used to manage signaling between the access terminals 14 and the radio network 22. Note that some forward link channel information transmitted by the radio network 22 is commonly used by all of the access terminals 14 that are active within a given sector of the radio network 22.

Figure 2B:
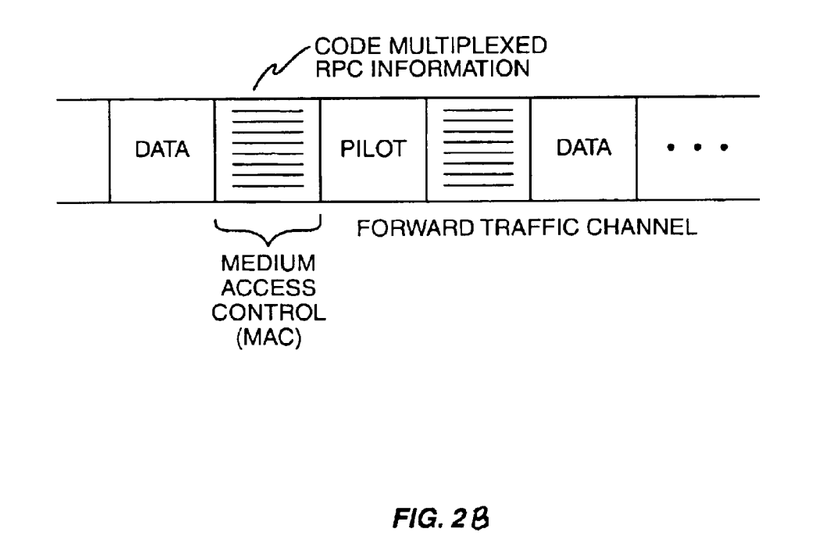
FIG 2B illustrates data carried on a forward traffic channel according one embodiment of the present invention.

As seen in FIG. 2B, forward link channels include the pilot channel, medium access control (MAC) channel, common control channel, and data channels, which are time multiplexed into the forward traffic channel. The MAC channel includes multiple reverse power control (RPC) channels, which are code multiplexed into the MAC channel. The different RPC channels carry power control information for different access terminals 14 connected with the radio network 22. At any given time, only one access terminal 14 is allocated a any given RPC channel.

A given RPC channel is used to transmit power control information to a specific access terminal 14. The power control information is in the form of a power control bit that instructs the access terminal 14 to either increase or decrease its transmit power. By keeping the transmit power of each active access terminal 14 constrained to the minimum level necessary to maintain reliable signal demodulation, the radio network 22 minimizes interference between all active access terminals 14 operating in a given region. Thus, reverse link power control maximizes the total number of subscribers that can simultaneously use the radio network 22.

When an access terminal 14 has an open connection with the radio network 22, it is expected to continuously transmit to the radio network 22 on its assigned reverse link traffic channel. The reverse traffic channel actually comprises several sub-channels that are used to send data traffic and control information from the access terminal 14 to the radio network 22. Thus, the radio network 22 continuously receives information from the access terminal 14 during an open packet data connection.

An access terminal 14 engaged in an open packet data connection with the IS-856 radio network 22 appears to be in an idle state from the perspective of the IS-2000 radio network 28. As defined by the IS-2000 standard, an access terminal 14 that is in idle state must perform certain functions from time to time to maintain its registration with the radio network 28. Typically, this entails periodically monitoring certain paging or control channels transmitted by the radio network 28 for incoming paging, messaging, or other call information. Additionally, the access terminal 14 must handle idle state handoff procedures and other registration procedures as needed.

Because there is no inter-network communication between the two radio networks 22 and 28, the access terminal 14 must suspend its communication with the IS-856 radio network 22 to monitor the paging channel and to perform needed idle state processing on the IS-2000 radio network 28. The typical time of suspension ranges from something on the order of 100 ms, to times in excess of several seconds. The time of suspension depends on what idle state processing is required. For example, simply checking a paging channel will take less time than handling an idle state handoff. When the access terminal 14 completes idle state processing in the IS-2000 radio network 28, it resumes communication with the IS-856 radio network 22 by transmitting on the reverse link channel and demodulating its assigned RPC channel.

When the access terminal 14 suspends communication with the IS-856 radio network 22, the IS-856 radio network 22 will detect a loss of the signal on the reverse link traffic channel and initiate a fade timer to time the duration of the inactivity. The fade timer is a mechanism used by the radio network 22 to free up unused resources. When the access terminal 14 resumes communication the fade timer is reset. However, if the fade timer expires before the access terminal 14 resumes communication, the radio network 22 terminates the connection and releases the network resources supporting the dormant access terminal's connection, including the forward and reverse link channels and the RPC channel. Those resources can then be reassigned to another access terminal 14 requesting a connection with the radio network 22. The returning access terminal 14 may be unaware that its prior connection with the radio network 22 was terminated.

Potential problems arise if an access terminal 14 returning from a period of suspended communication, whose connection has been terminated by the radio network 22, resumes communication with the radio network 22 using its prior connection setup. The resources supporting the connection with the returning access terminal 14, including the RPC channel, may have been reallocated by the radio network 22 to another access terminal 14. The particular type and severity of problems associated with the returning access terminal 14 inadvertently resuming communication using reassigned resources may vary depending upon the particulars of the radio network involved. At the least, the transmissions of the returning access terminal 14 will increase the level of radio interference. In radio networks that use individually assigned channels to control the transmit power of the active access terminals 14, such as those based on IS-856, the problems are potentially severe.

As noted above, a situation may arise where the returning access terminal 14 resumes its reverse link power control operations based on an RPC channel that has be reallocated to another access terminal 14, causing the returning access terminal 14 to erroneously control its transmit power. Its erroneous power control may interfere with the radio network 22 and the other active access terminals 14 in a manner that can result in a loss of service.

Figure 3:
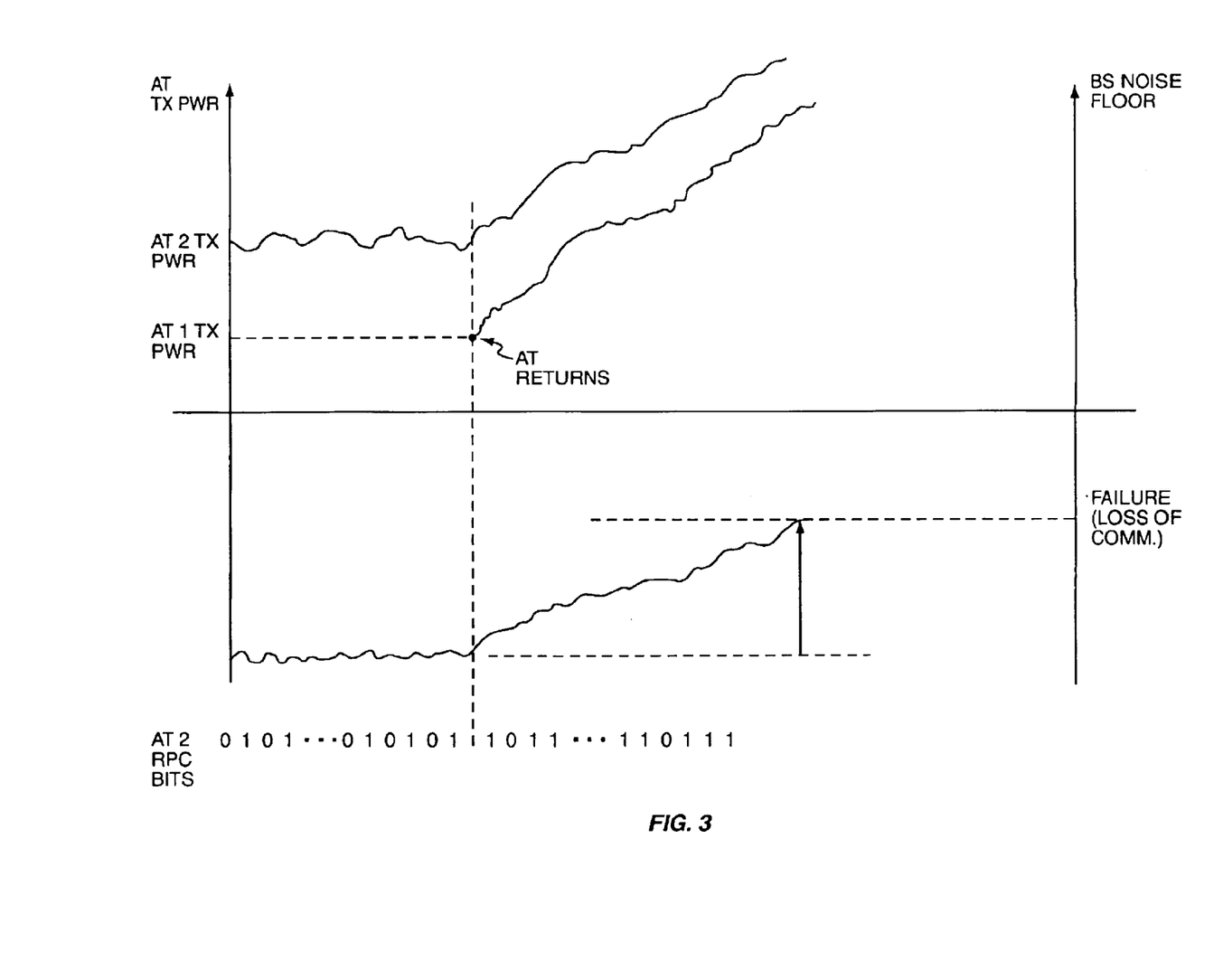
FIG. 3 is a diagram of a power control problem addressed by the present invention.

FIG. 3 illustrates a potential power control problem arising with two or more access terminals 14 using the same RPC to receive reverse link power control information. The primary horizontal access denotes time, while the left and right vertical axes denote access terminal transmit power and base station noise floor, respectively. The radio network 22 includes one or more base stations (not shown) that provide the RF signaling between the radio network 22 and the access terminals 14.

Assume that an access terminal 14 denoted as AT1 had previously established a connection with the radio network 22, but then suspended communication with the radio network 22 to perform idle state procedures required by radio network 28. Further assume that the time of suspension exceeds that permitted by the radio network 22, and that the associated network resources dedicated to that connection are released.

A new access terminal 14 denoted as AT2 then establishes a connection with the radio network 22 and is assigned the RPC channel previously assigned to AT1. When AT1 returns from suspension, it responds to power control information intended for AT2. Depending on the distance between the involved base station and AT1, AT1 may transmit at a power level dramatically higher than it should.

This action causes the signal noise floor at the involved base station to increase. An increase in the noise floor results in a commensurate decrease in the received signal-to-noise ratio of all access terminals 14 with an open connection to the base station. This results in the base station commanding the access terminals 14, including AT1 and AT2, to increase reverse link transmit signal power. This is reflected by the sudden and continuing upward trend in the transmit power from AT1 and AT2, and in the illustrated sequence of reverse channel power control bits in the RPC channel assigned to AT1. Typically, the power control bit sequences average out to a equal mix of 1's and 0's, which maintains the transmit power at a given level. To increase transmit power, the radio network 22 transmits more 1's than 0's. Similarly, to decrease power, more 0's than 1's are transmitted.

As the interference from AT1 continues raising the noise floor of the base station, the radio network 22 continues commanding AT2 (and any other affected access terminals 14) to increase their reverse link transmit power, creating a positive feedback relationship. As the noise floor increases, the base station begins losing the reverse communication links with the various access terminals 14 in its coverage area. These losses result because the access terminals 14 are power-limited and will at some point be unable to increase transmit power enough to overcome the noise floor. The access terminals 14 furthest away from the base station are typically the first to drop out of communication.

Depending on the base station itself, it may continue operating even in the presence of escalating noise and dropped connections, or may implement some form of jamming detection which causes it to suspend or halt operation once signal conditions deteriorate beyond a given threshold. In any case, the net effect of the above scenario is that the service area supported by the affected base station is lost, resulting in the attendant loss of the access terminals 14 supported by that base station.

The above failure scenario may be avoided if the returning access terminal 14 is prevented from using its previously assigned channels after its connection is terminated. Existing protocols have a mechanism to notify an access terminal 14 when its connection is terminated. In current systems, this is accomplished by transmitting a connection release message to the access terminal 14. This mechanism is not available in the above-described scenario, however, since the access terminal 14 is inaccessible to radio network 22 while it is communicating with the IS-2000 radio network 22. Therefore, the access terminal 14 will not receive the connection release message.

According to the present invention, the access terminal 14 may, for example, be configured with a suspension timer that corresponds to the maximum inactivity time-out or fade timer used by the radio network 22. The network's inactivity timer or fade timer is simply a defined duration of time after loss of reverse link traffic from a given access terminal 14 that may pass before the radio network 22 releases the dedicated communication resources. Thus, if the access terminal 14 keeps track of how long its communication with the radio network 22 was suspended, it can determine whether or not its suspension exceeded the maximum allowed time. If so, the access terminal 14 will request a new connection rather than use previously allocated resources.

A number of different approaches are available for providing maximum suspension time information to the access terminal 14. In one approach, a suspension time-out value may be stored in the access terminal 14 manually or automatically, as part of its configuration information. In a more flexible approach, the access terminal 14 receives the information from the radio network 22. For example, the radio network 22 might broadcast suspension time-out information as part of the control channel information. Such information may be included in the sector parameters message defined by the IS-856 standard. Alternatively, the radio network 22 might include suspension time-out information when access terminal 14 establishes a connection with the radio network 22. For example, the suspension or time-out value may be included as part of the traffic channel assignment message.

Figure 4:
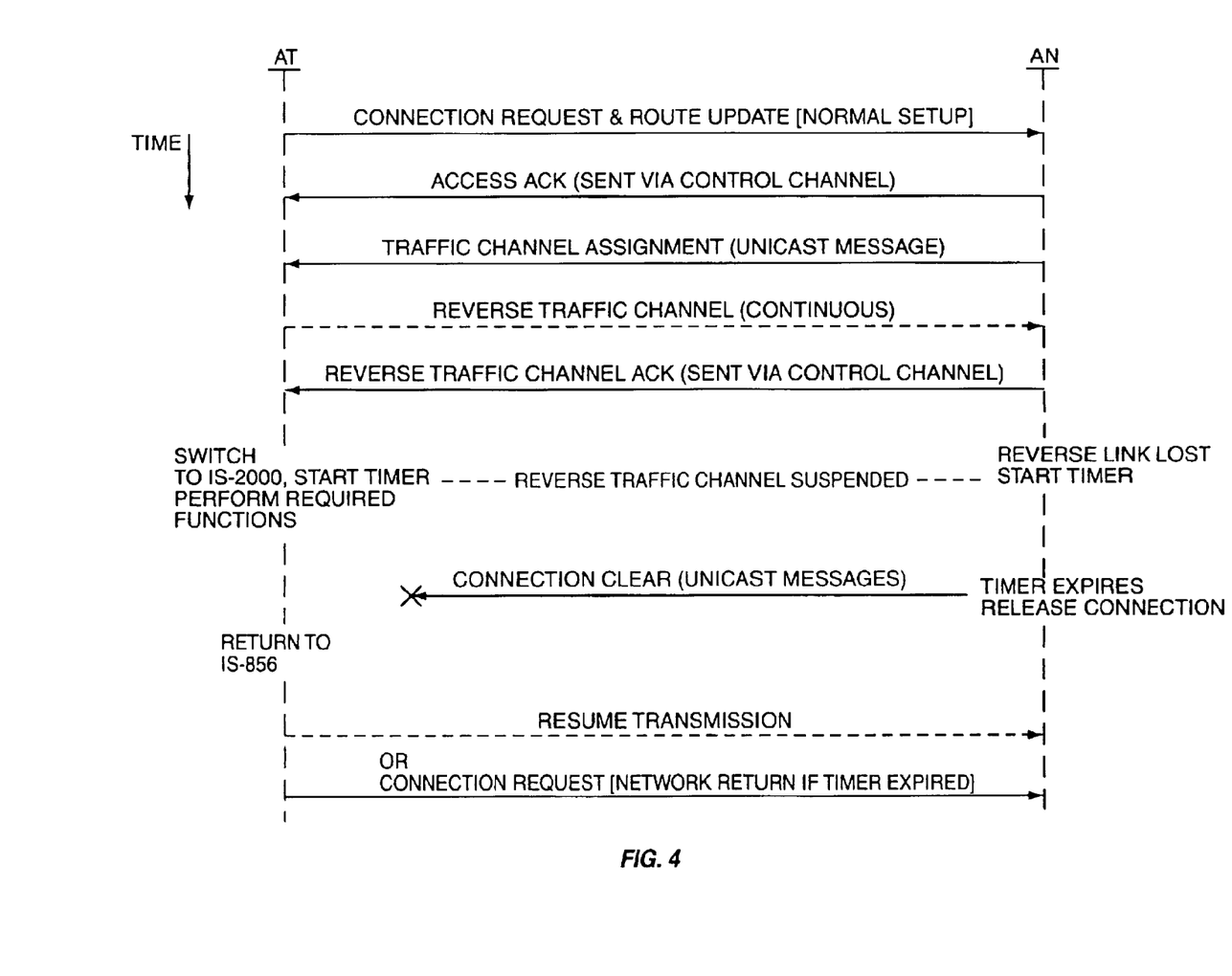
FIG. 4 is an exemplary call flow diagram between an access terminal and an access network.

FIG. 4 is a diagram of exemplary radio network connection management in accordance with the present invention. The access terminal 14 sends a connection request and route update message to the access network 12, which supports high rate packet data communication in accordance with IS-856. This connection request is for a new connection between the radio network 22 and the access terminal 14 so normal connection setup information is used.

The radio network 22 responds to the connection request by returning an access acknowledgement message to the access terminal 14 via a forward control channel. Then, the radio network 22 transmits a Unicast traffic channel assignment (TCA) message to the access terminal 14 that contains information needed to set up the connection between the access terminal 14 and the radio network 22. Upon receiving the TCA message, the access terminal 14 begins transmitting on its reverse link traffic channel. The radio network 22 acquires and locks with the reverse link traffic signal from the access terminal 14 and sends a reverse link traffic channel acknowledgement in response via the forward link control channel.

At some later point in time, the access terminal 14 suspends its reverse link traffic channel communication with the radio network 22 so that it can perform idle state processing associated with the IS-2000 radio network 28. Upon suspending IS-856 communication, the access terminal 14 begins monitoring its time of suspension.

At roughly the same point in time, the radio network 22 detects loss of the reverse link traffic channel and begins timing the duration that the link is inactive. The radio network 22 may use a fade timer for this purpose. The fade timer typically serves to time reverse link time-outs regardless of whether the loss stems from an access terminal 14 actually suffering from signal fade, or because it intentionally suspended its communication.

Once the fade timer expires, the radio network 22 sends a directed message (a Unicast message) to the access terminal 14 that its connection has been released. In this example, the access terminal 14 remains busy with idle state processing in the IS-2000 environment and misses the connection release message.

Upon completion of IS-2000 idle state processing the access terminal 14 returns to the IS-856 environment in a manner dependent upon whether its suspension timer has expired. If its timer has not expired, the access terminal 14 resumes communication with the access network 12 using the communication resources previously assigned to it by the radio network 22. If the timer has expired, the access terminal 14 issues a connection request so that a new connection between it and the radio network 22 may be established. The access terminal 14 may provide information to the radio network 22 indicating that it is returning from a period of suspension longer than that allowed by the radio network 22. This may have value in terms of performance monitoring at the radio network 22.

Radio network operators necessarily monitor the network performance and dropped connections may be a key measure of network performance or reliability. With a potentially substantial number of access terminals 14 periodically suspending communication with the radio network 22 to perform IS-2000 idle state processing, it may be expected that some percentage of dropped connections stem from excessively long suspensions, rather than actual signal reception problems. Absent an opportunity to discriminate between drops caused by intentional suspension versus drops caused by signal reception problems, network operators would be unable to develop an accurate picture of true network performance.

To request a connection with the radio network 22, the access terminal 14 sends a "ConnectionRequest" message to the radio network 22. The ConnectionRequest message as defined by IS-856 has a set of fields, including a Message ID, a Transaction ID, and a Request Reason.

Current defined values of the RequestReason field may be extended to include a provision for indicating when the access terminal 14 is returning from a suspended connection with the radio network 22. Of course, such information may be conveyed to the radio network 22 using a message other than the ConnectionRequest message. For example, the IS-856 standard may be extended to include some other defined message type or format for conveying such information.

Also, the information received by the access terminal 14 from the radio network 22 may be extended to include a value for the suspension timer relevant to the particular radio network 22 to which the access terminal 14 is connected. This may simply require the radio network 22 to transmit its fade timer value to the access terminal 14. In any case, receiving the required time out value from the radio network 22 is flexible in that the access terminal 14 does not need to be configured with any default suspension timer information and the value is free to vary across different radio networks 22.

Figure 5:
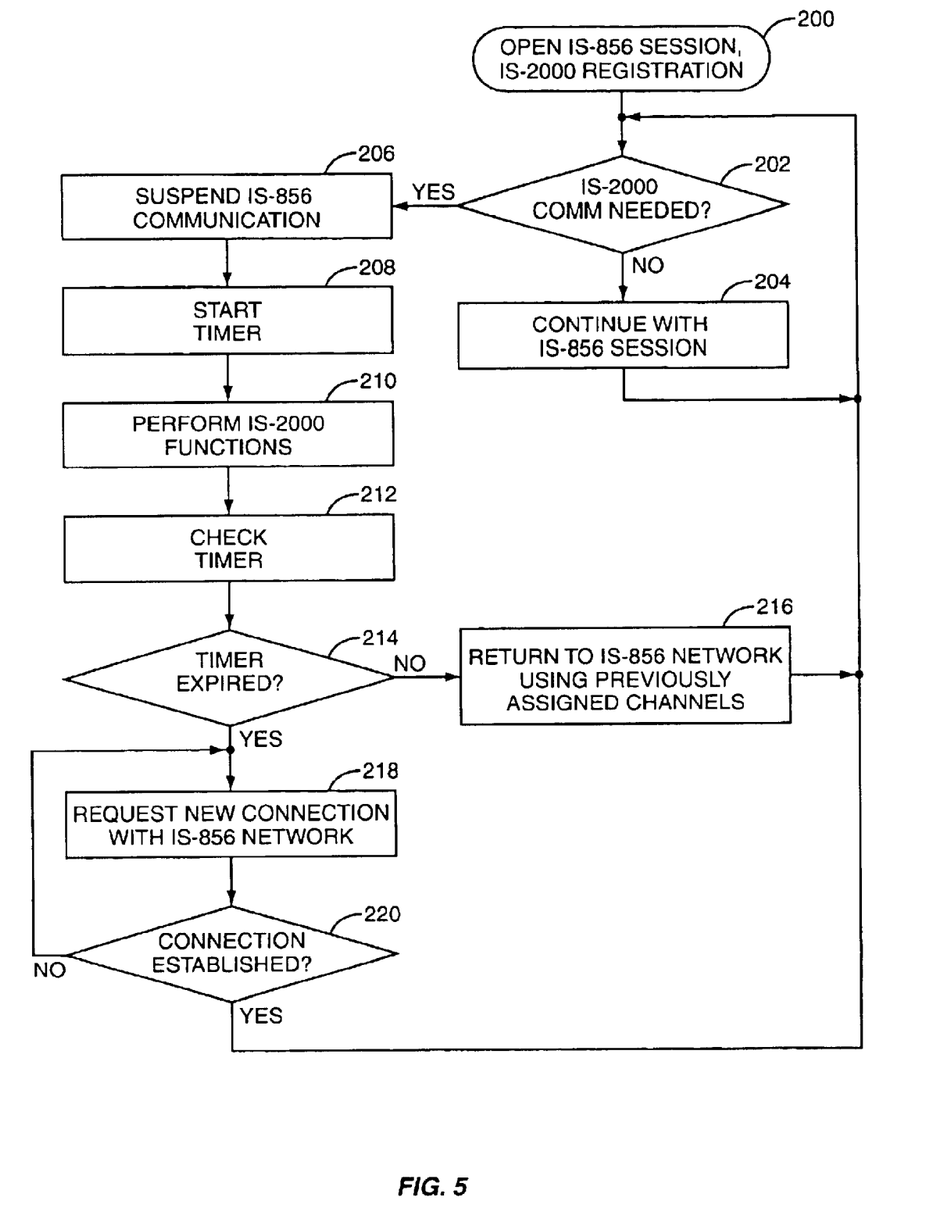
FIG. 5 is a diagram of exemplary flow logic for an access terminal in accordance with the present invention.

FIG. 5 is an exemplary logic flow diagram for an access terminal 14 in accordance with the present invention. Processing begins with the assumption that the access terminal 14 has an open packet data connection with the radio network 22 but is required to maintain registration within a separate IS-2000 radio network 28 (block 200). If IS-2000 idle state procedures are not yet required (block 202), the access terminal 14 continues with its packet data connection (block 204). However, if IS-2000 idle state processing is necessary, the access terminal 14 suspends communication on its connection with the radio network 22 (block 206), starts its suspension timer (block 208), and performs the idle state processing needed (block 210).

As noted earlier, idle state processing may require comparatively little time, or may be a relatively lengthy undertaking. In short, idle state processing may require the access terminal to suspend IS-856 communication for no more than a few tens of milliseconds, or for as much as several seconds. In any case, when idle state processing is completed, the access terminal 14 checks its suspension timer (block 212) to see if it has exceeded the maximum suspension time permitted by the IS-856 radio network (e.g., radio network 22) (block 214).

If the maximum permissible suspension time is not exceeded, the access terminal 14 returns to the IS-856 radio network 22 using its previously assigned communication channels (block 216). If the maximum suspension time is exceeded, the access terminal 14 issues a completely new connection request based on the assumption that its previously assigned communication resources have been released and possibly reused (block 218). The access terminal 14 may attempt several connection requests (blocks 218 to 220), or may perform other processing (not shown) if its connection request is denied.

Figure 6:
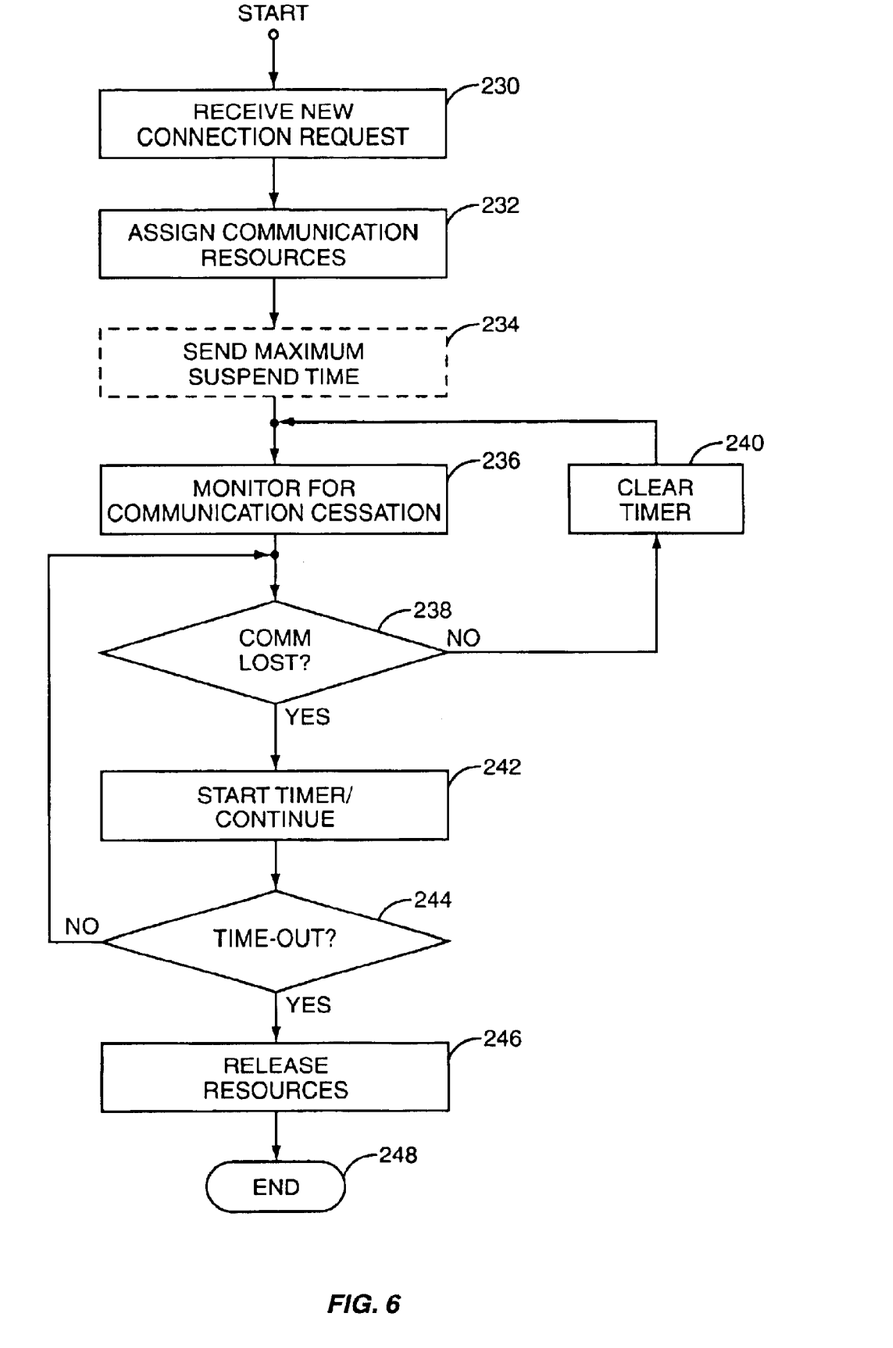
FIG. 6 is a diagram of exemplary flow logic for an access network in accordance with the present invention.

FIG. 6 is an exemplary logic flow diagram from the perspective of the radio network 22. It receives a new connection request from an access terminal 14 that is establishing a new connection with the access network 12 (block 230). In response, communication resources, including assigned communication channels, are assigned to the access terminal 14. Part of the information transmitted to the access terminal 14 includes the maximum suspension time value, as discussed above (block 234). This information may optionally be sent as part of the communication setup procedures, or may be broadcast generally by the radio network 22.

The access network 12, and more specifically, the radio network 22, monitors the reverse link traffic channel from the access terminal 14 for loss of communication (block 236). If the reverse traffic channel from the access terminal 14 remains active (block 238), the radio network 22 clears or resets the associated timing function (block 240) and continues monitoring. If the reverse traffic channel is lost, the radio network 22 begins timing the duration of the loss (block 242). If communication is lost for more than the allowed period of time (block 244), the radio network 22 releases the resources that were assigned to the dropped access terminal 14 (block 246) and processing ends. If the time period has not expired, the radio network continues monitoring and timing operations (blocks 238 through 244).

Figure 7:
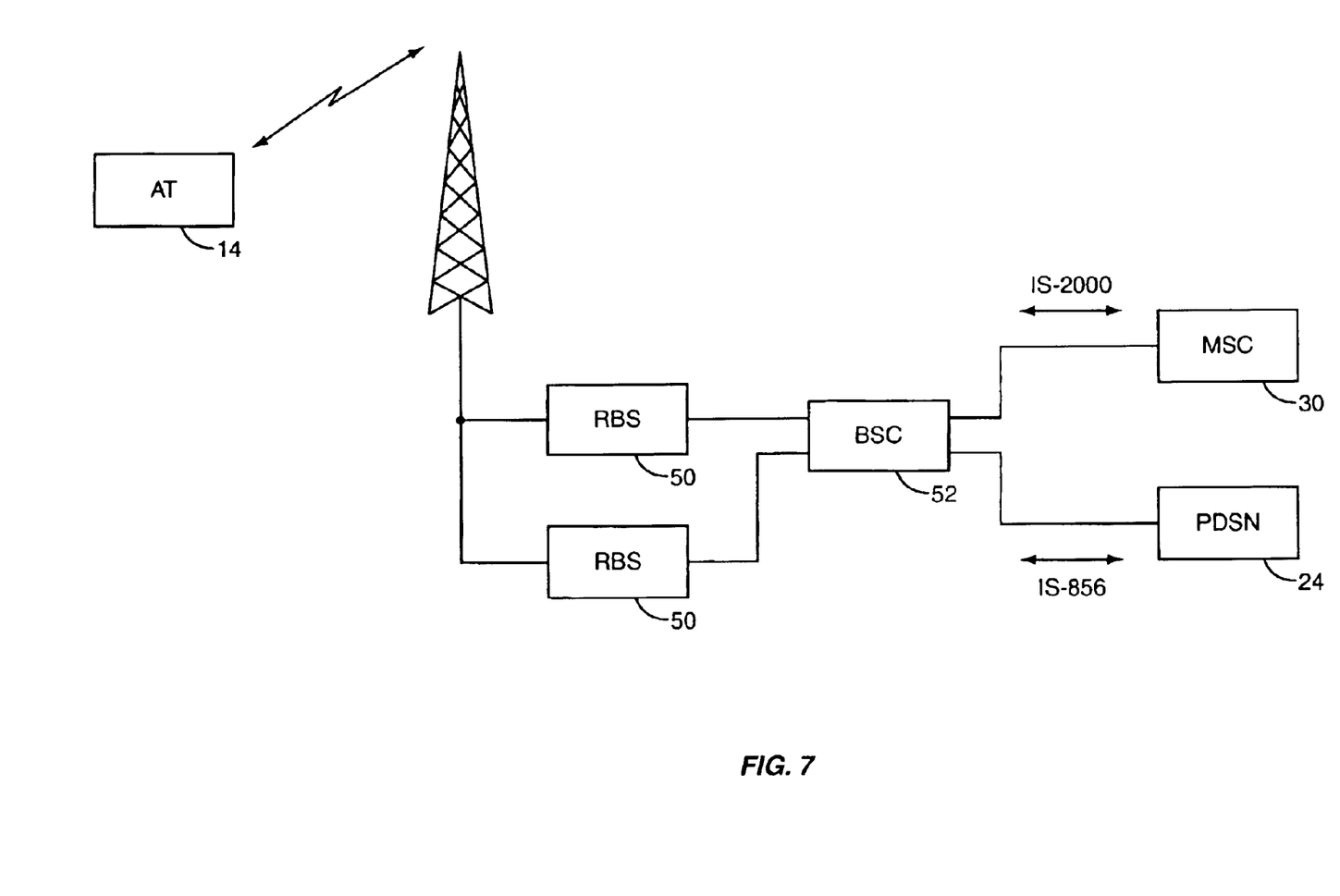
FIG. 7 is a diagram of an exemplary physical implementation for the wireless communication system of FIG. 1.

FIG. 8 is an exemplary diagram for a physical implementation of the access networks 12 and 18 introduced in FIG. 1. It should be understood that access network implementation is subject to significant variation and may or may not involve the simplified resource sharing depicted. The arrangement depicted is illustrative only.

Two or more radio base stations (RBS) 50 provide RF signaling with one or more access terminals 14. The RBSs 50 interface the access terminal 14 with a base station controller 52 that provides interconnection with the MSC 30 and the PDSN 24. With regard to FIG. 1, the upper RBS 50, the BSC 52, and the MSC 30 may comprise access network 18, while the lower RBS 50, the BSC 52, and the PDSN 24 may comprise access network 12. As noted, many other sharing or segregation arrangements are possible.

In operation, the BSC 52 manages communication resource allocation for the RBSs 50, and provides numerous interface and call/session management functions supporting interaction between the access terminal 14 and the PSTN 20, and any available packet data networks 16 (e.g., the Internet).

Within the above framework, it should be understood that the access terminal 14 may be one of a broad range of device types. The access terminal 14, might, for example, be a cellular telephone with packet data capability, or may be a personal digital assistant (PDA) with wireless communication capability. The access terminal 14 may take on many other forms, for example, it may be a radio interface module adapted to provide wireless capability to a portable computing and communication device.

As with the many variations of types of access terminals, the present invention is itself subject to much variation. It is not dependent on specific implementations or architectures for the access networks. While it may have particular value within the IS-856/IS-2000 framework discussed in detail above, it is not limited to implementations involving these specific network types. Thus, the foregoing discussion and associated drawings should be considered exemplary rather than limiting. Indeed, the present invention is limited only by the scope of the claims and their reasonable equivalents.

What is claimed is:

1. A method of managing radio network access in an access terminal, the method comprising:

establishing a connection with a first radio network;

suspending communication with said first radio network to communicate with a second radio network;

monitoring the time communication with said first radio network is suspended while communicating with said second radio network;

resuming communication with said first radio network using said previously established connection with said first radio network if the duration of suspended communication does not exceed a maximum suspension time; and requesting a new connection with said first radio network if the duration of suspended communication exceeds said maximum suspension time.

2. The method of claim 1 further comprising receiving said maximum suspension time from said first radio network.

3. The method of claim 2 wherein the maximum suspension time is received by said access terminal during a connection establishment procedure.

4. The method of claim 3 wherein the maximum suspension time is received by said access terminal as part of a channel assignment message.

5. The method of claim 3 wherein the maximum suspension time is received by said access terminal in a broadcast control message.

6. The method of claim 1 wherein said access terminal requests a new connection with said first radio network by transmitting a connection request message to said first radio network.

7. The method of claim 6 wherein said connection request message transmitted by said mobile terminal to said first radio network includes a dropped call indication to notify said first radio network that a previously established connection with said first radio network was terminated.

8. The method of claim 1 wherein said first radio network comprises an IS-856 radio network.

9. The method of claim 8 wherein said second radio network comprises an IS-2000 radio network.

10. The method of claim 1 further comprising storing a default maximum suspension time in said access terminal.

11. A method of managing radio network access in a radio network, said method comprising:

establishing a connection with an access terminal;

transmitting a maximum suspension time to said access terminal to indicate the maximum allowed suspension time.

12. The method of claim 11 wherein said maximum suspension time is transmitted to said access terminal during a connection establishment procedure.

13. The method of claim 12 wherein said maximum suspension time is transmitted to said access terminal as part of a channel assignment message.

14. The method of claim 12 wherein said maximum suspension time is transmitted to said access terminal as part of a channel assignment message.

15. The method of claim 11 further comprising terminating said connection with said access terminal if communication with said access terminal ceases for a period that exceeds said maximum suspension time.

16. The method of claim 15 further comprising receiving a connection request from said access terminal to establish a new connection following termination of an earlier connection.

17. The method of claim 16 wherein said connection request received from said access terminal includes a dropped call indication notifying said radio network that said earlier connection with said access terminal was terminated.

18. The method of claim 17 further comprising giving said access terminal priority access to said first radio network if said connection request includes a dropped call indication.

19. The method of claim 11 wherein said radio network comprises an IS-856 radio network.

20. A method of managing radio network access in a radio network, the method comprising:

establishing a connection between an access terminal and a first radio network;

transmitting a maximum suspension time from said first radio network to said access terminal;

suspending communication with said first radio network by said access terminal to communicate with a second radio network;

monitoring, at said access terminal, the time communication with said first radio network is suspended while said access terminal is communicating with said second radio network;

resuming communication by said access terminal with said first radio network using said previously established connection with said first radio network if the duration of suspended communication does not exceed said maximum suspension time; and requesting a new connection by said access terminal with said first radio network if the duration of suspended communication exceeds said maximum suspension time.

21. The method of claim 20 wherein said maximum suspension time is transmitted by said first radio network to said access terminal during a connection establishment procedure.

22. The method of claim 21 wherein said maximum suspension time is transmitted by said first radio network to said access terminal as part of a channel assignment message.

23. The method of claim 21 wherein said maximum suspension time is transmitted by said first radio network in a broadcast control message.

24. The method of claim 20 further comprising terminating said connection between said first radio network and said access terminal if said mobile terminal ceases communication with said first radio network for a period that exceeds said maximum suspension time.

25. The method of claim 24 further comprising receiving a connection request at said first radio network from said access terminal to establish a new connection following termination of an earlier connection.

26. The method of claim 25 wherein said connection request transmitting by said access terminal to said first radio network includes a dropped call indication notifying said first radio network that said earlier connection with said access terminal was terminated.

27. The method of claim 26 further comprising giving said access terminal priority access to said first radio network if said connection request includes a dropped call indication.

28. The method of claim 20 wherein said first radio network comprises an IS-856 radio network.

29. The method of claim 28 wherein said second radio network comprises an IS-2000 radio network.

30. An access terminal comprising:

a dual mode transceiver for communicating with a first radio network in a first mode and a second radio network in a second mode;

a controller programmed to:

establish communication with said first radio network in said first mode;

suspend communication with said first radio network in said second mode;

maintain a timer in said second mode to monitor the time communication with said first network is suspended;

resume communication with said first radio network using said previously established connection with said first radio network if the duration of suspended communication does not exceed a predetermined maximum suspension time;

request a new connection with said first radio network if the duration of suspended communication exceeds said maximum suspension time.

31. The access terminal of claim 30 wherein said mobile terminal requests a new connection with said first radio network by transmitting a connection request message to said first radio network.

32. The access terminal of claim 31 wherein said connection request message includes a dropped call indication to notify said first radio network that an earlier connection with said first radio network was terminated.

33. A radio network comprising:

a base transceiver station for communicating with an access terminal;

a base station controller programmed to:

establish a connection with said access terminal; and transmit a maximum suspension time to said access terminal to indicate a maximum allowed suspension time before communication with said access terminal will be terminated.

34. The radio network of claim 33 wherein said maximum allowed suspension time is transmitted to said access terminal during a connection establishment procedure.

35. The radio network of claim 34 wherein the maximum allowed suspension time is transmitted to said access terminal as part of a channel assignment message.

36. The radio network of claim 35 wherein said base station controller is further programmed to terminate said connection with said access terminal if communication with said access terminal ceases for a period that exceeds said maximum suspension time.

37. The radio network of claim 36 wherein said base station controller is further programmed to grant said access terminal priority access to said first radio network if an earlier established connection was terminated by said base station controller.

* * * * *